Dec. 31, 1946.  J. BERGER  2,413,484
TEST LIGHT
Filed Sept. 2, 1942  2 Sheets-Sheet 1
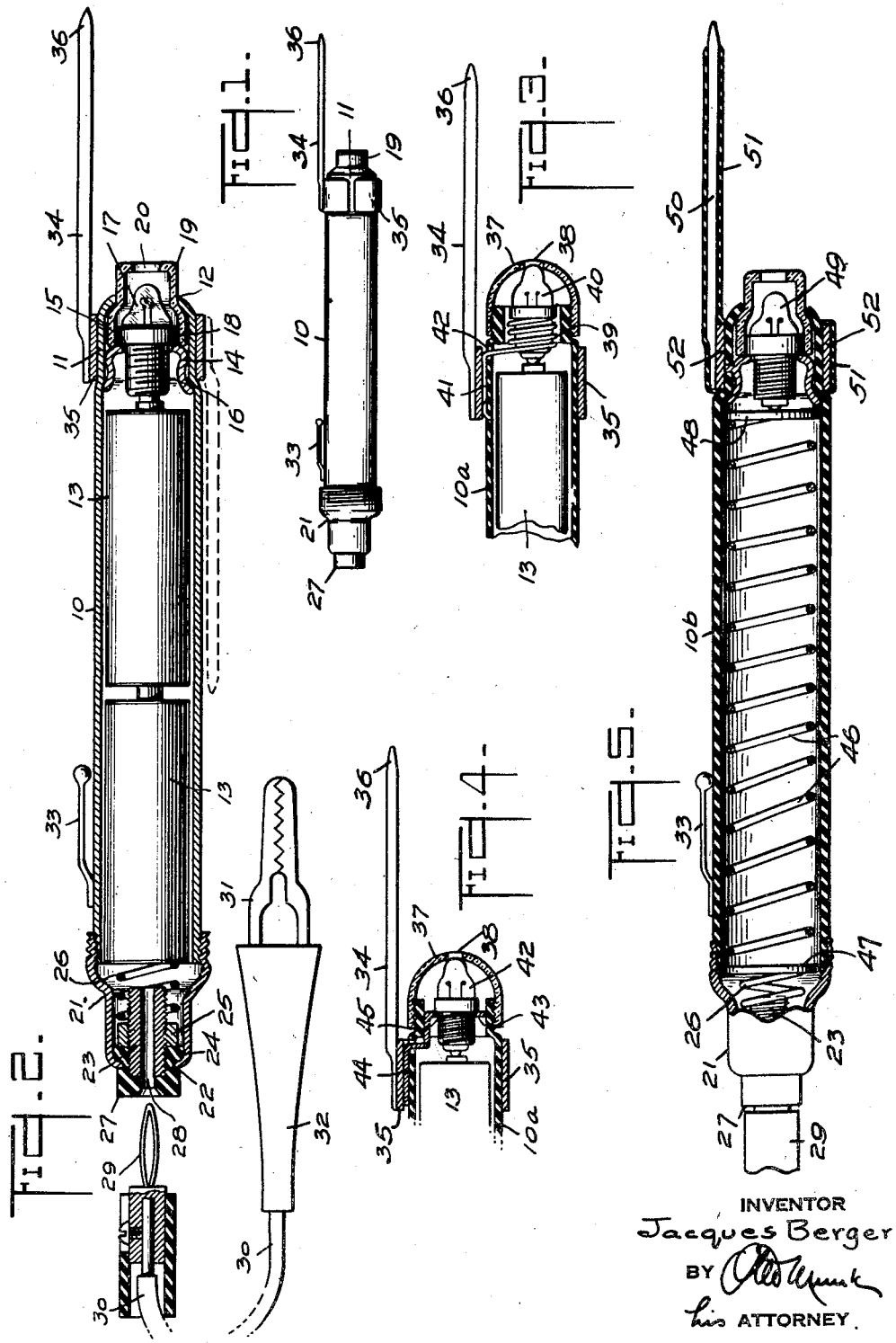
INVENTOR
Jacques Berger
BY
his ATTORNEY.

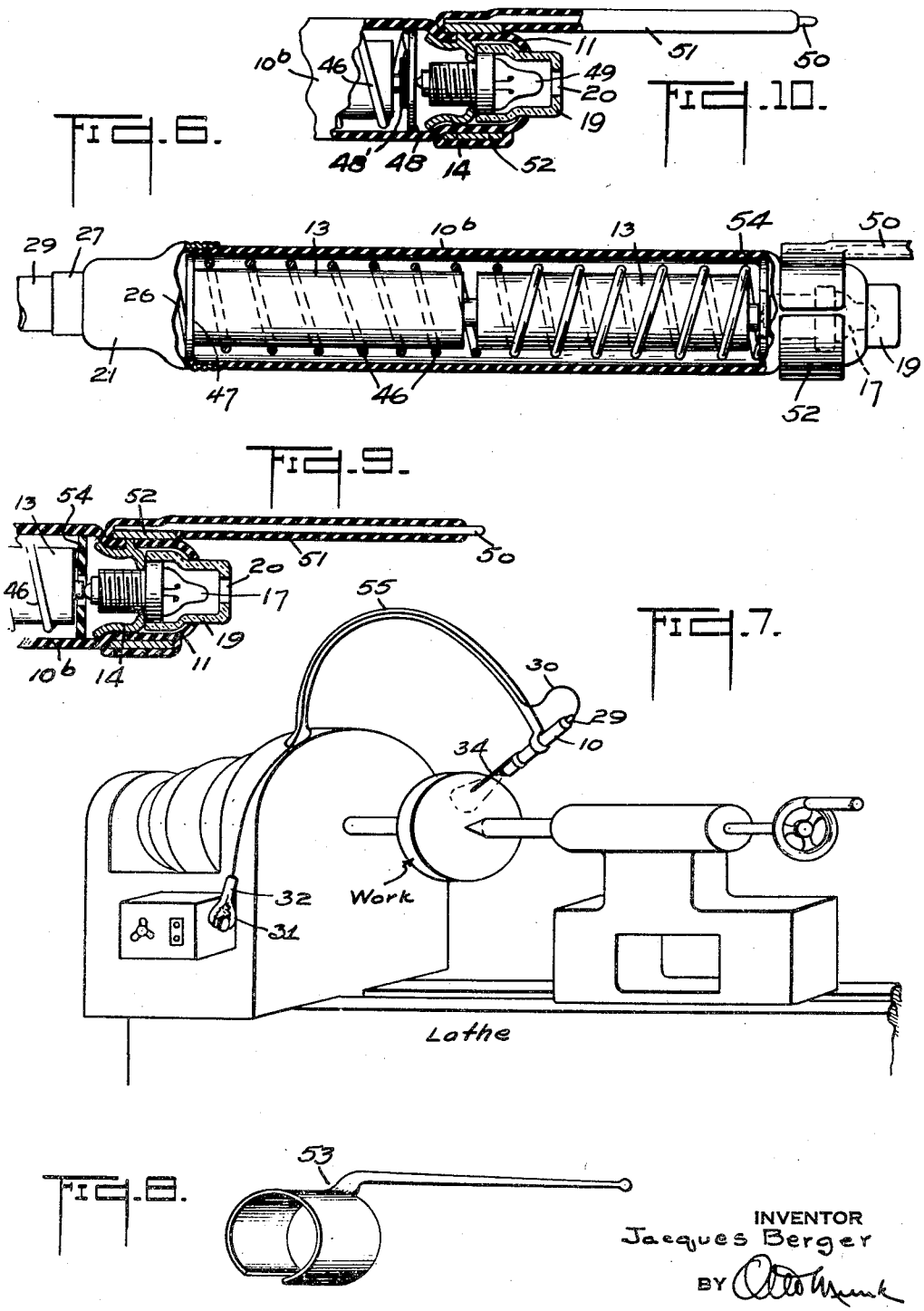

Patented Dec. 31, 1946

2,413,484

UNITED STATES PATENT OFFICE 2,413,484

TEST LIGHT

Jacques Berger, Chicago, Ill.

Application September 2, 1942, Serial No. 457,036

4 Claims. (Cl. 175—183)

My invention relates generally to electrical testing devices and has reference particularly to improvements in the pocket size electrical tester or trouble indicating instrument.

Testing for continuity of electrical circuits is one of the most frequent and important functions of persons engaged in the manufacture, installation operation, maintenance and repair of electrical systems, installations and apparatus of all kinds. Testing instruments in common use at the present time are expensive and inconvenient as to portability and method of operation and in many instances are limited in practical efficiency under various conditions. The present invention is constructed to supply the need for a circuit testing device which is so light, compact and inexpensive that it may be carried in the pocket or tool kit of every workman and at the same time will be free of the limitations found in instruments of this character which are now available.

It is the object of my invention to provide a novel construction of an electrical testing device, of the pocket type, which embodies in its construction adjustable alligator type terminals, detachable couplings of the jack plug type, dry cells which furnish the operating power for the electric bulb constituting the signal element, a nail or blade-like exploring or testing prod mounted at one end of the battery and lamp case and adapted to be reversed in its position on the case for convenience in arrangement while in actual use or as a safe and compact disposition of the prod at other times, and a flexible insulated conductor having a plug attachment at the opposite end of the case and a clamp with spring jaws for holding to any desired part of the electrical installation being tested.

A still further object of my invention is to provide a testing unit of the character described which is applicable for use in testing so-called "live circuits" of any voltage and frequency, and to determine for A. C. or D. C. current.

I accomplish these and other objects by means of certain novel arrangements and combinations of parts hereinafter described, set forth in the appended claims and illustratively exemplified in the accompanying drawings. To simplify the drawings, the cells and bulb are shown in construction as being arranged in the manner conventional of flashlights:

Figure 1 is an elevational view of one embodiment of my pocket electrical testing device where a metal case is used;

Figure 2 is a substantially longitudinal sectional view of the testing device showing the plug connections and exploring prod;

Figure 3 is a substantially longitudinal sectional view of a modified embodiment of testing device showing a casing of plastic or moulded fiber material;

Figure 4 is a longitudinal sectional view of the torch end of the casing showing a flat spring socket light assembly;

Figure 5 is a substantially longitudinal sectional view of a still further modification of testing light designed especially for use on live wire circuits of any voltage or frequency;

Figure 6 is a substantially longitudinal sectional view of a test light showing that the features of Figures 2 and 5 may be combined by substituting certain parts of one for the other whereby the test light is changeable for use on a live circuit instead of on a dead circuit;

Figure 7 is a perspective view of a lathe on a very particular mechanical application of the test light;

Figure 8 is a perspective view of a prod which in addition to its function as a prod, is usable as a clip to hold the test light in the operator's pocket;

Figures 9 and 10 are substantially longitudinal sectional views of the prod ends of the testing device.

Referring now to the drawings and particularly to Figures 1 and 2, 10 denotes a cylindrical casing or barrel having its rear portion exteriorly threaded and its forward end slightly reduced in diameter to provide a step 11 which is turned in slightly at its outer end to form a reduced opening 12. The casing 10 accommodates two dry cells 13 placed end to end as illustrated.

A U-shaped contact spring 14 is mounted inside the step end 11 of the casing and consists of two arms having their free ends turned outwardly to engage the barrel 10 under the shoulder at the rise of the step 11. The closed end of the contact spring 14 is provided with an opening 15 to receive the threaded shank 16 of an electric bulb 17, the latter abutting and making contact with the center terminal of the foremost battery 13, and having a collar 18 abutting the closed end of the spring contact 14, as illustrated in Figure 2. A translucent shade 19 which may be colored encloses the bulb 17 and comprises a stepped thimble shaped member the larger end being seated at its free inner end against the closed end of the spring contact 14, while the smaller end projects through the opening 12 in the step 11 of the barrel 10. The outer end of the small end of the thimble or shade 19 is provided with an opening 20 through which the light from the bulb is projected.

The threaded rearward end of the barrel 10 receives a screw cap 21, which is reduced in diameter beyond the barrel end and is turned in slightly at its outer end to form a restricted opening 22. Mounted coaxially of the opening 22 is an exteriorly threaded thimble 23, which carries a washer 24 seated against the turned in end of the cap 21 and a nut 25 adapted to be tightened against the washer 24. A helical spring 26 loosely embraces the thimble 23 and has one end abutting the nut 25 and the other end yieldably pressing against the end of the inner battery or cell 13. A threaded cap 27 of insulating material screws over the end of the thimble 23 projecting beyond the opening 22 of the screw cap 21 so as to form an integral unit or jack for the rear of the case 10. The thimble 23 and cap 27 are provided with a uniform coaxial bore 28 to receive a spring contact plug 29 attached to one end of a flexible electrical conduit 30, the opposite end thereof carrying a spring alligator type clamp 31 backed by an insulated handle or grip piece 32.

A clip 33 is attached to the outer surface of the cylindrical casing 10 adjacent the rearward end thereof for convenience in detachably connecting the testing device to an operator's pocket.

A prod 34 is detachably carried by the bulb end of the casing 10 and comprises a split spring collar 35 embracing the casing and having an axially projecting blade or tester tip 36. The prod may be reversed when not in use so as to bring the blade or tip 36 towards the rear and over the body of the casing 10, as shown in dotted lines in Figure 2. It may be also shaped as a regular fountain pen clip and used as such in place of the part 33. Such a prod is illustrated in Figure 8.

Referring now to Figure 3, 10a denotes the barrel which in this modification is made preferably of electrically non-conductive material, such as a plastic or moulded fiber, in order to protect the operator from burns which might otherwise result from accidental contact of the casing with a live circuit. A further advantage of a plastic case is that the same can not short-out a circuit if accidentally laid across it and a still further advantage is that no false indication of circuit continuity can be given by the case if in testing it should accidentally touch a circuit other than the one being tested by the exploring prod.

In Figure 3, the barrel or casing 10a is reduced in diameter at the bulb end and exteriorly threaded to receive a dome-shaped shade 37, the same consisting preferably of a plastic material which may be translucent and colored in any desirable shade to facilitate visibility in the daylight. The center of the dome is provided with an opening 38 to allow use of the device as a regular flashlight as well as for testing purposes. A helical spring socket 39 supports the bulb 42 in the throat of the threaded end portion of the casing 10a, one end 41 of the spring socket being projected outwardly of the casing through an opening 42 and along the surface axially thereof where it returns and its end is fixed in the casing. The split collar 35 of the prod contacts the end 41 of the socket 39 to allow the current to pass into the prod 34.

Figure 4 shows a casing structure and dome similar to that in Figure 3, but in this modification the bulb 42 is supported in a flat spring socket 43 which comprises a flat section 44 outside the casing and an angular section inside the same, one arm of the latter section projecting transversely of the casing and being provided with an opening 45 to receive the threaded shank of the bulb.

It is to be noted that the features of Figures 2 and 5 may be combined to change over from a test light used on dead circuit to one for a live circuit so as to dispose the coils of spring 46 concentrically of the cells 13 so that when changing from one use of the test light (dead circuit) to the other (live circuit), only the bulb requires changing and metal disc 48 must be substituted for a washer of insulating material. The metal disc 48 must have in this case an insulating surface 48' at the center of its bottom face which contacts the dry cell, so as to electrically insulate the dry cell from the metal disc.

Referring now to Figure 5, the present invention is illustrated as being embodied in a structure suitable for use in testing live circuits of any voltage and frequency and for determining A. C. and D. C. currents. The construction of parts in this modification is similar to that illustratively exemplified in Figures 1 and 2 except that the batteries are omitted and the casing 10b is made of a plastic or other electrically non-conductive material. A helical spring 46 is substituted for the batteries, one end of the spring contacting a flat metal disc 47, which is held against the barrel by the spring 26, while the other end of the spring 46 is in contact with a second metal disc 48 which carries a contact point abutting the terminal of the bulb 49, the bulb in the present instance being of the neon type.

In order to afford protection against the prod when live circuits are involved in the testing operation, the needle 50 of the prod itself is provided with an insulation covering 51 which allows only the tip end of the prod to be exposed for exploring purposes, and which covers the outer surface and sides of the ring or collar 52.

According to the present invention, the test light device resembles the structure of a pocket flash light of the fountain pen type and comprises adjustable terminals of the alligator type and detachable coupling of the jack plug type. Ordinary dry cells furnish the operating power and an electric bulb constitutes the signal element. The needle like exploring or testing prod mounted on one end of the battery casing is reversible for convenient arrangement either for actual use or for safe and compact disposition at other times. The prod may be of the design shown in Figure 8 in which it takes the shape of a holding clip 53 and is used instead of part 33.

Figure 6 shows the elements of Figures 2 and 5 combined in such a way that spring 46 is disposed concentrically of the cells 13 and the only change required to switch from one use of the test light (dead circuit) to the other (live circuit) is to substitute bulb 49 for bulb 17 and metal disc 48 for an insulating washer 54.

An extremely important feature of the present arrangement resides in the disposition of the light with respect to the tip of the prod, whereby the signal light projects directly onto the prod and the operator may therefore concentrate his attention upon the illuminated tip without looking in any other direction. Another important feature resides in the fact that the test prod and signal light are an integral unit, which requires only one hand to operate leaving the other hand of the operator free for other purposes.

The use of a visual signal in accordance with the present invention eliminates the difficulty experienced when a device with a bell or other audible signal is used and where several testing instruments in one location would tend to cause confusion. The low cost and extremely portable character of the pen type tester make it practical for every operator to possess his own instrument and to have it at hand at all times. This is not feasible when such laboratory instruments, as ohmmeters or volt meters, are used for circuit testing. Devices of the neon tube type which are available for testing fuses can be used only when the fuse is in a "hot" circuit and at best prove whether the line is "hot" or not, rather than to indicate the condition of the fuse. The present invention, on the contrary, provides a true and reliable means of testing a fuse not in place.

Figure 7 illustrates a very particular mechanical application of the test light, which, in this instance, is used to detect high and low spots on work in a lathe, planer or other mechanical device. The test light is found to be very helpful especially in setting up work in these machines involving the centering of work, squaring it or in making other adjustments. In practice the test light is supported on the end of a flexible conduit tube 55, which permits the test light to be brought into the desired position but which is sufficiently rigid to obtain proper testing results.

Having now described my invention and the manner in which the same operates and may be used, what I claim and desire to secure by Letters Patent is:

1. A circuit testing device, comprising a cylindrical holder, a cap at one end of said holder, a lamp socket and lamp mounted in said cap including a flexible lamp socket supporting the lamp and being in contact with one terminal thereof, said lamp socket having an electroconductive portion projecting along the outside of the holder, a prod comprising a split ring to embrace the cap and contact the outside portion of the lamp socket, and an axially projecting exploring blade reaching beyond the end of the holder and cap, a shade enclosing the lamp and carried by the cap consisting of translucent colored material and being provided with an opening therein for permitting light from the lamp to pass therethrough to illuminate the blade of the prod, said prod being reversible on the holder to bring the blade over the latter in the direction of the opposite end thereof, a separate contact carrying member, and means including a flexible cable to establish electrical connection between said second contact carrying member and the second terminal of said lamp.

2. A circuit testing device, comprising a cylindrical holder, an electric jack connection carried by said holder, a lamp socket and lamp mounted in said holder at one end thereof, a prod including a metal collar to embrace said end of said holder containing said lamp and an exploring metal blade integral with and projecting axially from said collar, said prod being adapted to be mounted on said holder by means of said collar selectively in an operative position in which said blade projects axially beyond said end of said holder and in a reverse position in which said blade is disposed adjacent the outer peripheral wall of said holder with its tip pointing in the direction of the opposite end thereof, means for establishing an electric connection between one terminal of said lamp and said collar when said prod is mounted on said holder in said operative position, means for establishing an electrical connection between the other terminal of said lamp and said jack connection, and a shade enclosing said lamp and carried by said holder, said shade being provided with an opening therein for permitting light from said lamp to pass therethrough to illuminate the blade of said prod when the latter is in said operative position.

3. A circuit testing device, as claimed in claim 2, in which said means for establishing an electrical connection between the other terminal of said lamp and said jack connection includes a battery set arranged within the holder, one terminal of said battery set being connected to said jack connection and its other terminal being connected to the second terminal of said lamp.

4. A circuit testing device, as claimed in claim 2, in which said holder consists of an electrically nonconductive material and said means for establishing an electrical connection between the other terminal of said lamp and said jack connection includes a spiral spring arranged in said holder to establish an electrical connection between the second terminal of said lamp and said jack connection.

JACQUES BERGER.